US008991262B2

(12) United States Patent
Nakatani

(10) Patent No.: US 8,991,262 B2
(45) Date of Patent: Mar. 31, 2015

(54) CAPACITIVE PRESSURE SENSOR, MANUFACTURING METHOD THEREOF, AND PRESSURE SENSOR PACKAGE

(71) Applicant: Rohm Co., Ltd., Kyoto (JP)

(72) Inventor: Goro Nakatani, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 169 days.

(21) Appl. No.: 13/912,434

(22) Filed: Jun. 7, 2013

(65) Prior Publication Data

US 2013/0327149 A1 Dec. 12, 2013

(30) Foreign Application Priority Data

Jun. 7, 2012 (JP) ................. 2012-129985

(51) Int. Cl.
| G01L 9/00 | (2006.01) |
| G01L 9/16 | (2006.01) |
| H01L 29/84 | (2006.01) |
| H01L 21/00 | (2006.01) |
| G01L 9/12 | (2006.01) |

(52) U.S. Cl.
CPC ................. G01L 9/12 (2013.01); G01L 9/0073 (2013.01)
USPC .................. 73/754; 73/715; 438/53; 257/415

(58) Field of Classification Search
None
See application file for complete search history.

(56) References Cited

U.S. PATENT DOCUMENTS

| 5,317,922 | A * | 6/1994 | Bomback et al. ................ 73/724 |
| 6,584,852 | B2 * | 7/2003 | Suzuki et al. ................... 73/718 |
| 6,847,090 | B2 * | 1/2005 | Loeppert ........................ 257/418 |
| 6,876,048 | B2 * | 4/2005 | Fischer et al. ................ 257/417 |
| 7,132,307 | B2 * | 11/2006 | Wang et al. ..................... 438/53 |
| 7,153,718 | B2 * | 12/2006 | Fischer et al. ................... 438/55 |
| 7,919,346 | B2 * | 4/2011 | Kaelberer et al. ............. 438/50 |
| 8,283,738 | B2 * | 10/2012 | Fujii et al. ..................... 257/415 |
| 8,497,557 | B2 * | 7/2013 | Tanaka et al. ................. 257/415 |
| 8,604,565 | B2 * | 12/2013 | Fujii et al. ..................... 257/415 |
| 8,829,630 | B2 * | 9/2014 | Sakuragi et al. ............. 257/419 |
| 8,921,954 | B2 * | 12/2014 | Kautzsch et al. ............. 257/415 |

FOREIGN PATENT DOCUMENTS

JP 2011-146687 7/2011

* cited by examiner

*Primary Examiner* — Peter Macchiarolo
*Assistant Examiner* — Jermaine Jenkins
(74) *Attorney, Agent, or Firm* — Hamre, Schumann, Mueller & Larson, P.C.

(57) ABSTRACT

A capacitive pressure sensor includes a semiconductor substrate, a first insulating portion configured to define a sensor region, a reference pressure chamber configured to divide a lower portion of the sensor region in a direction, a second insulating portion configured to divide a surface portion of the sensor region above the reference pressure chamber in the direction, and a trench configured to divide the sensor region in the direction. The sensor region is divided into at least three semiconductor parts by the reference pressure chamber, the second insulating portion, and the trench.

18 Claims, 18 Drawing Sheets

CAPACITIVE PRESSURE SENSOR, MANUFACTURING METHOD THEREOF, AND PRESSURE SENSOR PACKAGE

CROSS-REFERENCE TO RELATED APPLICATION

This application is based upon and claims the benefit of priority from Japanese Patent Application No. 2012-129985, filed on Jun. 7, 2012, the entire contents of which are incorporated herein by reference.

TECHNICAL FIELD

The present disclosure relates to a capacitive pressure sensor, a manufacturing method thereof, and a package having such a capacitive pressure sensor.

BACKGROUND

Recently, the wide use of smart phones has increased the use of pressure sensors capable of sensing pressure in a height direction. A piezo-resistive pressure sensor for detecting a variation in a resistance value of a piezo-resistive element as a variation in pressure has been proposed.

For example, there is known a pressure sensor including a base substrate, a cap substrate having a concave portion and bonded to the base substrate to form a space between the concave portion and the base substrate, a membrane formed within the space by using a portion of the base substrate, and an impurity diffused region formed in the membrane and serving as a pressure sensor element. In the pressure sensor, the membrane is displaced according to pressure applied thereto and a change in a resistance value of the impurity diffused region based on the displacement is measured to detect pressure.

However, characteristics of the piezo-resistive element may be varied depending on a change in an ambient temperature, and thus, detecting pressure has deviations when the ambient temperature is changed. Thus, for the pressure sensor using the piezo-resistive element, correction is essential in detecting pressure.

SUMMARY

The present disclosure provides various embodiments of a capacitive pressure sensor capable of reducing deviations in detection precision and further capable of sensing a minute change in pressure based on differential outputs. Some embodiments include a package having the same.

Further, according to some embodiments, there is a method of manufacturing a capacitive pressure sensor capable of reducing deviation in detection precision and further capable of sensing a minute change in pressure based on differential outputs.

According to some embodiments of the present disclosure, provided is a capacitive pressure sensor, including a semiconductor substrate configured to have an insulating layer and an upper semiconductor layer formed thereon; a first insulating portion formed in the upper semiconductor layer to surround a sensor region disposed in an internal area of the upper semiconductor layer, the sensor region being defined by the first insulating portion together with the insulating layer; a reference pressure chamber formed in a lower portion of the sensor region to divide the lower portion of the sensor region in a direction traversing the first insulating portion, a lower surface of the reference pressure chamber being defined by the insulating layer; a second insulating portion formed in a surface portion of the sensor region above the reference pressure chamber to divide the surface portion of the sensor region in the direction; and a trench formed from a surface of the upper semiconductor layer until the insulating layer to divide the sensor region in the direction, wherein the sensor region is divided into at least three semiconductor parts disposed in sequence in the direction by the reference pressure chamber, the second insulating portion, and the trench, the three semiconductor parts being insulated from one another, and wherein the three semiconductor parts comprise: a membrane disposed between the reference pressure chamber and the trench; a first electrode facing the membrane with the reference pressure chamber being interposed therebetween; and a second electrode facing the membrane with the trench being interposed therebetween.

With this configuration, a first capacitor is formed by the first electrode and the membrane facing one another with the reference pressure chamber interposed therebetween. Further, a second capacitor is formed by the membrane and the second electrode facing one another with a trench interposed therebetween. That is, with the membrane used as a common movable electrode interposed therebetween, fixed electrodes are disposed at both sides of the membrane. Therefore, when the membrane receives pressure, for example, the membrane is displaced by a distance a in a direction toward the first electrode, and a distance between the first electrode and the membrane is $(-\alpha)$ while a distance between the membrane and the second electrode is $(+\alpha)$. Thus, by taking a difference between a variation in capacitance of the first capacitor and a variation in capacitance of the second capacitor, the sum of the variations in capacitance of the two capacitors can be obtained as a detection value. For example, when a variation in capacitance of the first capacitor due to the displacement of the membrane is $(+\Delta C_1)$ and a variation in capacitance of the second capacitor is $(-\Delta C_2)$, $(\Delta C_1 + \Delta C_2)$ may be obtained as the detection value based on input pressure. As a result, even when the membrane receives minute pressure, the pressure can be precisely detected.

Further, since pressure is detected on the basis of a variation in capacitance, deviations in detection precision can be reduced even in a situation where an ambient temperature variously changes, in comparison to a case in which a piezo-electric element is used as an element for detecting pressure.

In some embodiments, the semiconductor substrate may have a structure in which the insulating layer is sandwiched between a lower semiconductor layer and the upper semiconductor layer.

In this configuration, an area of the membrane can be adjusted by changing a design value of a thickness of the upper semiconductor layer. Thus, by forming the upper semiconductor layer as thick as possible within a range of the design dimensions of the capacitive pressure sensor, an effective area of the membrane can be increased and detection precision can be enhanced. For example, the upper semiconductor layer may have a thickness ranging from 15 μm to 30 μm.

In some embodiments, the lower semiconductor layer and the upper semiconductor layer may be formed of silicon, and the insulating layer may be formed of silicon oxide.

An SOI (Silicon on Insulator) substrate can be prepared, reducing the burden of preparing the semiconductor substrate.

In some embodiments, the reference pressure chamber may have a predetermined width in the direction.

With this configuration, a distance between electrodes of the first capacitor is constant in an initial stage, so the first capacitor may be considered as a parallel-plate capacitor. As a result, the capacitance of the first capacitor may be simply obtained by using a formula C=(εS)/d.

In some embodiments, the trench may have a predetermined width in the direction.

With this configuration, a distance between electrodes of the second capacitor is constant in an initial stage, so the second capacitor may be considered as a parallel-plate capacitor. As a result, the capacitance of the second capacitor may be simply obtained by using a formula C=(εS)/d.

In some embodiments, the membrane may have a thickness ranging from 0.5 µm to 5 µm.

In some embodiments, a plurality of the sensor regions may be arranged on the semiconductor substrate in a matrix form. Alternatively, a plurality of the sensor regions may be arranged on the semiconductor substrate in a stripe form.

Pressure can be more precisely detected by arranging the plurality of sensor regions.

In some embodiments, the first insulating portion may include a first insulating layer made of an insulating material selectively buried in the semiconductor substrate. Further, the second insulating portion may include a second insulating layer made of an insulating material selectively buried in the semiconductor substrate.

In some embodiments, the capacitive pressure sensor may include a plurality of wirings disposed between an inner side and an outer side of the sensor region, and wherein the plurality of wirings may include a first wiring connected to the first electrode, a second wiring connected to the second electrode, and a third wiring connected to the membrane.

In some embodiments, an interior of the reference pressure chamber may be hermetically closed.

When the interior of the reference pressure chamber are air-tight, a change in pressure within the reference pressure chamber due to a change in an ambient temperature can be prevented. As a result, the detection precision of pressure can be enhanced.

According to another embodiment of the present disclosure, provided is a pressure sensor package, including the capacitive pressure sensor of above configuration; a circuit chip configured to have a differential circuit for detecting pressure acting on a membrane on the basis of a difference between a variation in capacitance of a first capacitor configured by a first electrode and the membrane and a variation in capacitance of a second capacitor configured by the membrane and a second electrode; and a case configured to accommodate the circuit chip and the capacitive pressure sensor, wherein the capacitive pressure sensor is disposed on the circuit chip such that an opened surface of a trench of the capacitive pressure sensor faces upwardly. With this configuration, a pressure sensor package capable of reducing a deviation in detection precision and further having detection precision coping with even a minute change in pressure due to a differential output can be realized.

According to some other embodiments of the present disclosure, provided is a method of manufacturing a capacitive pressure sensor, including preparing a semiconductor substrate having an insulating layer and an upper semiconductor layer formed thereon; forming a surrounding trench from the surface of the semiconductor substrate to the insulating layer to surround a sensor region disposed in an internal area of the upper semiconductor layer; forming a first insulating layer to fill the surrounding trench, thereby defining the sensor region in a surface portion of the semiconductor substrate by the insulating layer and the first insulating layer; selectively forming a plurality of concave portions in the sensor region; forming a protective layer in each inner surface of the plurality of concave portions; selectively removing portions on lower surfaces of the concave portions in the protective layer; forming a reference pressure chamber for dividing a lower portion of the sensor region in a direction traversing the first insulating layer by digging the concave portions toward the insulating layer through anisotropic etching, and then connecting lower portions of the plurality of concave portions through isotropic etching; forming a second insulating layer for dividing a surface portion of the sensor region above the reference pressure chamber in the direction by changing a portion sandwiched by neighboring through holes into a silicon oxide layer such that a through hole formed of the concave portion penetrating between the surface of the semiconductor substrate and the reference pressure chamber through thermal oxidation treatment is filled with a silicon oxide layer, and at the same time the silicon oxide layers of the neighboring through holes are connected; and forming a trench from the surface of the semiconductor substrate to the insulating layer by etching the sensor region for dividing the sensor region in the direction.

In a pressure sensor manufactured according to this method, the sensor region is divided into at least three semiconductor parts disposed in sequence in the direction in the semiconductor substrate by the reference pressure chamber, the second insulating layer and the trench. The three semiconductor parts are insulated from one another. Further, the three semiconductor parts include a membrane disposed between the reference pressure chamber and the trench, a first electrode facing the membrane with the reference pressure chamber interposed therebetween, and a second electrode facing the membrane with the trench interposed therebetween. Thus, as described above, a capacitive pressure sensor capable of reducing a deviation in detection precision and further having detection precision coping with even a minute change in pressure due to a differential output can be realized.

Further, the membrane, the first electrode, and the second electrode can be formed by simply performing processing such as etching or thermal oxidization treatment on the semiconductor substrate, and thus, the capacitive pressure sensor can be simply manufactured.

In some embodiments, the semiconductor substrate may have a structure in which the insulating layer is sandwiched between a lower semiconductor layer and the upper semiconductor layer, and wherein the method may further include forming the upper semiconductor layer on the insulating layer through epitaxial growth, after forming the insulating layer on the lower semiconductor layer.

By regulating the conditions for epitaxial growth, a thickness of the upper semiconductor layer which becomes the membrane can be simply controlled.

In some embodiments, the method may further include removing the protective layer remaining on an inner surface of the through hole by supplying an etching gas to the through hole, before forming the second insulating layer.

For example, in case of forming the protective layer through plasma chemical vapor deposition (CVD), the quality of the protective layer is degraded, relative to a thermal oxide layer. Thus, in this method, the inner surfaces of the through hole is cleared by eliminating the protective layer and the semiconductor substrate is subsequently thermally oxidized to form the second insulating layer formed of the thermal oxide layer in the through hole, whereby the layer quality of the second insulating layer can be enhanced.

In some embodiments, the forming a second insulating layer may include performing thermal oxidation treatment in a vacuum state.

DETAILED DESCRIPTION

Figure 1A:
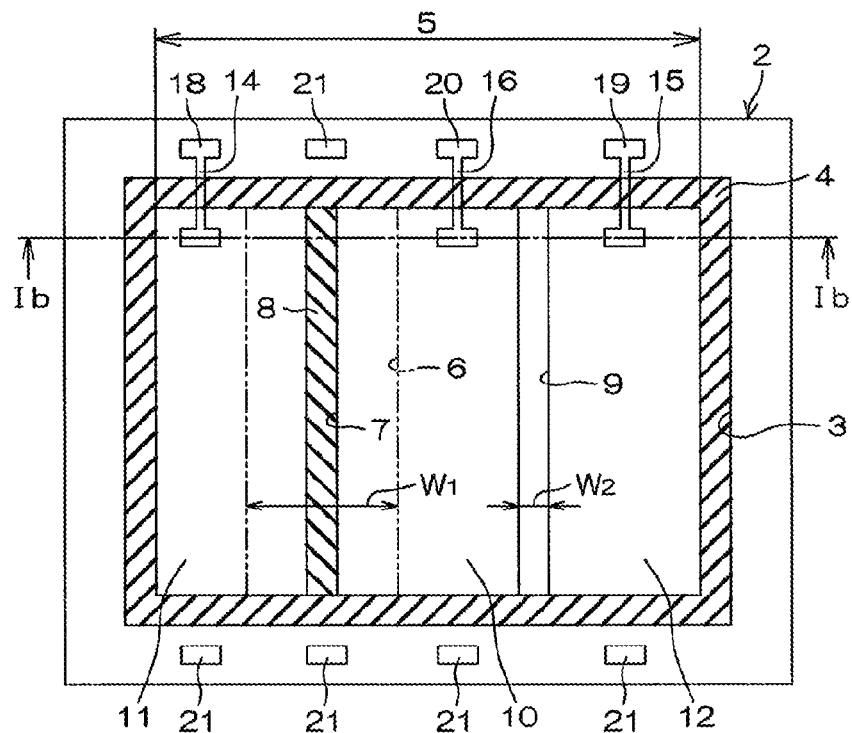
FIGS. 1A and 1B are views illustrating a structure of a pressure sensor according to an embodiment of the present disclosure.

Various embodiments of the present disclosure will now be described in detail with reference to the drawings. Throughout the drawings, the same or similar elements, members and processes are denoted by the same reference numerals and explanation of which will not be repeated. The described embodiments are provided for the purpose of illustration, not limitation, of the present disclosure and all features and combinations thereof described in the embodiments cannot be necessarily construed to describe the spirit of the present disclosure.

In the specification, the phrase "connection of a member A and a member B" is intended to include direct physical connection of the member A and the member B as well as indirect connection thereof via other member as long as the other member has no substantial effect on the electrical connection of the member A and the member B or has no damage to functions and effects shown by a combination of the member A and the member B. Similarly, the phrase "interposition of a member C between a member A and a member B" is intended to include direct connection of the member A and the member C or direct connection of the member B and the member C as well as indirect connection thereof via other member as long as the other member has no substantial effect on the electrical connection of the member A, the member B and the member C or has no damage to functions and effects shown by a combination of the member A, the member B and the member C.

Figure 1B:
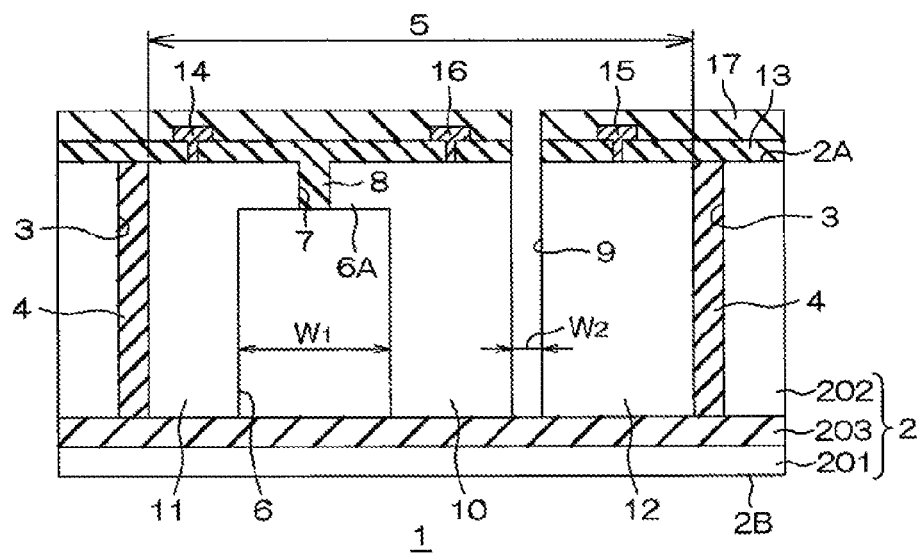

FIGS. 1A and 1B are views illustrating a structure of a pressure sensor 1 according to an embodiment of the present disclosure. FIG. 1A is a plan view and FIG. 1B is a cross-sectional view taken along line 1*b*-1*b* in FIG. 1A. It will be appreciated that, in FIG. 1A, some of the components of the pressure sensor 1 are omitted for clarification.

The pressure sensor 1 is a capacitive pressure sensor for detecting a variation in pressure on the basis of a variation in capacitance. In a manufacturing process, a plurality of pressure sensors 1 may be formed to be arranged in a regular pattern horizontally and vertically on a semiconductor substrate 2. As an example of the semiconductor substrate 2, an SOI (Silicon on Insulator) wafer 2 may be employed. Hereinafter the SOI wafer 2 is also referred to as an SOI substrate 2. The SOI substrate 2 has a structure including a lower semiconductor layer 201 and an upper semiconductor layer 202 (a portion constituting a surface portion of the SOI substrate 2) made of silicon, and an insulating layer 203 made of silicon oxide and sandwiched between the lower semiconductor layer 201 and the upper semiconductor layer 202. In some embodiments, the lower semiconductor layer 201 and the upper semiconductor layer 202 of the SOI substrate 2 are made of low-resistive silicon having specific resistance ranging from 5 mΩ·cm to 25 mΩ·cm, for example. Further, the upper semiconductor layer 202 may have a thickness ranging from 15 μm to 30 μm.

In the SOI substrate 2, an annular surrounding trench 3 is selectively formed from a surface 2A (an upper surface of the upper semiconductor layer 202) to the insulating layer 203. In this embedment, the surrounding trench 3 has a square ring shape (specifically, a quadrangular shape) when viewed from the plane (i.e., when viewed from a direction of the upper surface 2A of the SOI substrate 2). A first insulating layer 4 is buried in the surrounding trench 3. In this embodiment, the first insulating layer 4 is formed of silicon oxide ($SiO_2$), but it may also be formed of any other insulating materials. Thus, an internal region in the upper semiconductor layer 202 is demarcated by the first insulating layer 4 from a lateral side and demarcated by the insulating layer 203 from a lower side, forming a sensor region 5 insulated and separated from other parts of the upper semiconductor layer 202. The sensor region 5 may be insulated and separated from the upper semiconductor layer 202 disposed in a lateral side thereof by the surrounding trench 3 in which the first insulating layer 4 is not buried. That is, a first insulating portion which insulates the sensor region 5 from the other parts of the upper semiconductor layer 202 may be the surrounding trench 3 or the first insulating layer 4.

A reference pressure chamber (void) 6 is formed within the sensor region 5. The reference pressure chamber 6 is selectively disposed in a lower region of the surface portion of the sensor region 5, and a bottom portion thereof is defined by the insulating layer 203. When the first insulating layer 4 has a square ring shape with two pairs of sides facing one another when viewed from the plane, the reference pressure chamber 6 may be formed between a first pair of sides of the first insulating layer 4 (i.e., between a pair of horizontal sides of the first insulating layer 4 in FIG. 1A). In this case, the reference pressure chamber 6 may have a rectangular parallelepiped shape (rectangular shape when viewed from the plane). That is, one pair of facing lateral sides of the reference pressure chamber 6 are formed by the first insulating layer 4 and the other pair of lateral sides of the reference pressure chamber 6 are formed by the upper semiconductor layer 202. In addition, an upper surface of the reference pressure chamber 6 is formed by the upper semiconductor layer 202 and a lower surface of the reference pressure chamber 6 is formed by the insulating layer 203. In this embodiment, the reference pressure chamber 6 divides a lower portion of the sensor region 5 in a direction along the first pair of sides of the first insulating layer 4 (i.e., in a horizontal direction in FIG. 1A). Further, the reference pressure chamber 6 is hermetically closed as a void whose internal pressure is used as a reference when detecting pressure. In this embodiment, the reference pressure chamber 6 is maintained in a vacuum or decompressed state (e.g., $10^{-5}$ Torr).

A through hole 7 is formed in a surface portion (an upper wall 6A of the reference pressure chamber 6) of the sensor region 5 above the reference pressure chamber 6. The through hole 7 penetrates between the surface 2A of the SOI substrate 2 and the reference pressure chamber 6. Specifically, in this embodiment, the through hole 7 selectively divides the upper wall 6A of the reference pressure chamber 6 in the direction along the pair of lateral sides of the first insulating layer 4. When the first insulating layer 4 has the square ring shape with two pairs of sides facing one another when viewed from the plane, the through hole 7 may be a trench having a linear shape formed to be parallel to the reference pressure chamber 6 between the first pair of sides of the first insulating layer 4. The linear through hole 7 may be formed in an internal region of the upper wall 6A (i.e., in a central area of the upper wall 6A in the horizontal direction in FIG. 1A) spaced apart from both sides of the reference pressure chamber 6 formed of the upper semiconductor layer 202. In this case, since the upper wall 6A may be selectively left, a contact region of a third wiring 16 (to be described later) for the membrane 10 (upper semiconductor layer 202) can be secured.

A second insulating layer 8 is buried in the through hole 7. In this embodiment, the second insulating layer 8 may be formed of silicon oxide ($SiO_2$) or any other insulating materials. By the second insulating layer 8 and the reference pressure chamber 6, the sensor region 5 is divided into two insulated semiconductor parts in the horizontal direction (a direction traversing the reference pressure chamber 6 in this embodiment) along the surface 2A of the SOI substrate 2. A lateral surface of each semiconductor part is defined by the first insulating layer 4 or the second insulating layer 8, and a lower surface thereof is defined by the insulating layer 203.

In addition, a trench 9 is formed in the sensor region 5 from the surface 2A to the insulating layer 203 of the SOI substrate 2. Specifically, in this embodiment, the trench 9 selectively divides one of the two semiconductor parts of the sensor region 5, in the direction along the first pair of sides of the first insulating layer 4 (i.e., in the horizontal direction in FIG. 1A). When the first insulating layer 4 has the square ring shape with two pairs of lateral facing sides when viewed from the plane, the trench 9 may have a linear shape parallel to the linear through hole 7. That is, when viewed from the plane, mutually parallel two linear trenches (i.e., through hole 7 and the trench 9) may be formed between a second pair of sides of the first insulating layer 4 (i.e., a pair of horizontal sides of the first insulating layer 4 in FIG. 1A). One pair of mutually facing lateral surfaces of the trench 9 are formed by the first insulating layer 4, and another pair of facing surfaces of the trench 9 are formed by the upper semiconductor layer 202. Further, the trench 9 is opened in a direction of the surface 2A and a lower surface of the trench 9 is formed by the insulating layer 203. By the trench 9, one of the two semiconductor parts of the sensor region 5 is further divided into two insulated semiconductor parts in the direction traversing the reference pressure chamber 6 (i.e., in the horizontal direction in FIG. 1A).

To sum up, the sensor region 5 is divided into three semiconductor parts disposed in sequence in the direction traversing the reference pressure chamber 6 by the reference pressure chamber 6, the upper second insulating layer 8, and the trench 9. These three semiconductor parts are insulated from one another. And, the three semiconductor parts correspond to a membrane 10, a first electrode 11, and a second electrode 12, respectively. The membrane 10 is disposed between the reference pressure chamber 6 and the trench 9. The first electrode 11 faces the membrane 10 with the reference pressure chamber 6 (void) interposed therebetween, and the second electrode 12 faces the membrane 10 with the trench 9 (void) interposed therebetween.

In some embodiments, the reference pressure chamber 6 between the first electrode 11 and the membrane 10 has a predetermined width $W_1$ in the horizontal direction. For example, the width $W_1$ may range from 500 μm to 1000 μm. Further, in some embodiments, the trench 9 between the membrane 10 and the second electrode 12 has a predetermined width $W_2$ in the horizontal direction. For example, the width $W_2$ may range from 500 μm to 1000 μm. Further, in some embodiments, the membrane 10 disposed between the first electrode 11 and the second electrode 12 has a thickness ranging from 0.5 μm to 5 μm. The widths $W_1$ and $W_2$ may be equal or different. In some embodiments, the widths $W_1$ and $W_2$ are equal. When $W_1=W_2$, an absolute value of a variation in the capacitance $C_1$ of the first capacitor 22 (see FIGS. 2A and 2B) and an absolute value of a variation in the capacitance $C_2$ of the second capacitor 23 (see FIGS. 2A and 2B) to be described later may be set to be equal.

The surface 2A of the SOI substrate 2 is covered by an interlayer 13 made of an insulating material such as silicon oxide ($SiO_2$). A thickness of the interlayer 13 ranges from 5000 to 10000, for example. In this embodiment, the interlayer 13 may have a single-layer structure or multi-layer structure. Further, a rear surface 2B of the SOI substrate 2 (a lower surface of the lower semiconductor layer 201) is an exposed surface.

A first wiring 14, a second wiring 15, and a third wiring 16 are formed on the interlayer 13. The first wiring 14, the second wiring 15, and the third wiring 16 are made of aluminum (Al) in this embodiment. The first wiring 14 is connected to the first electrode 11 through the interlayer 13. The second wiring 15 is connected to the second electrode 12 through the interlayer 13. The third wiring 16 is connected to the membrane 10 through the interlayer 13. These wirings 14 to 16 traverse one lateral side of the first insulating layer 4 to span from an inner side to an outer side of the sensor region 5.

A surface protective layer 17 made of an insulating material such as silicon nitride (SiN) is formed on the interlayer 13. The first wiring 14, the second wiring 15, and the third wiring 16 are covered by the surface protective layer 17. Openings, exposing portions of the first wiring 14, the second wiring 15, and the third wiring 16 as a first pad 18, a second pad 19, and a third pad 20, respectively, are formed in the surface protective layer 17 at an outer side of the sensor region 5. The first pad 18, the second pad 19, and the third pad 20 are disposed to be spaced apart from one another along the one lateral side of the first insulating layer 4, for example. Also, besides the first pad 18, the second pad 19, and the third pad 20, a plurality of pads 21 may be disposed around the first insulating layer 4.

Figure 2A:
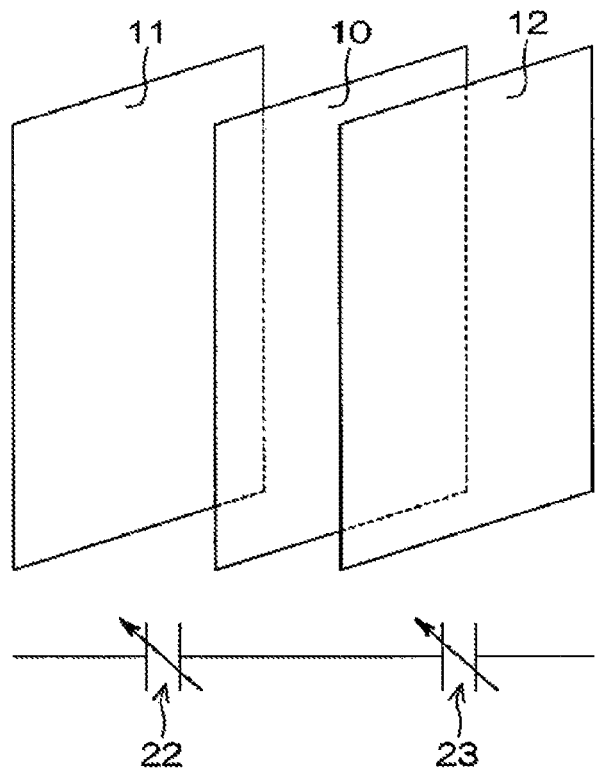
FIGS. 2A and 2B are views illustrating a capacitor of the pressure sensor.
Figure 2B:
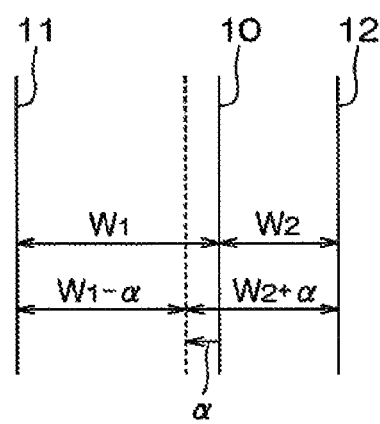

FIGS. 2A and 2B are views illustrating the capacitors 22 and 23 of the pressure sensor 1, in which FIG. 2A is a schematic view of the capacitors 22 and 23 and FIG. 2B is a view illustrating the operations of the capacitors 22 and 23, according to some embodiments.

As described above, the pressure sensor 1 includes the membrane 10, the first electrode 11 and the second electrode 12 facing one another with the membrane 10 interposed therebetween. The first electrode 11 is separated from the membrane 10 by a first predetermined interval (width $W_1$) and the second electrode 12 is separated from the membrane 10 by a second predetermined interval (width $W_2$). Thus, the first capacitor 22 is formed by the first electrode 11 and the membrane 10. The capacitance of the first capacitor 22 may be changed by a vibration of the membrane 10. The second capacitor 23 may be formed by the second electrode 12 and the membrane 10. The capacitance of the second capacitor 23 is also changed by the vibration of the membrane 10. That is, in the pressure sensor 1, the first electrode 11 and the second electrode 12 are fixed electrodes and the membrane 10 is a common movable electrode.

Thus, as illustrated in FIG. 2B, for example, when the membrane 10 is displaced by a distance a in a direction in which the membrane 10 approaches the first electrode 11, a distance between the first electrode 11 and the membrane 10 is $(W_1-\alpha)$ while a distance between the membrane 10 and the second electrode 12 is $(W_2+\alpha)$. Thus, by taking a difference between a variation in capacitance $C_1$ of the first capacitor 22 and a variation in capacitance $C_2$ of the second capacitor 23, the sum of the variations in the capacitances $C_1$ and $C_2$ of the two capacitors 22 and 23 may be obtained as a detection value. For example, when a variation in capacitance of the first capacitor 22 due to the displacement of the membrane 10 is $(C_1+\Delta C_1)$ and a variation of capacitance of the second capacitor 23 due to the displacement of the membrane 10 is $(C_2-\Delta C_2)$, $\Delta C_1+\Delta C_2$ may be obtained as a detection value corresponding to an input pressure. As a result, even when the membrane 10 receives minute pressure, the pressure can be precisely detected.

In addition, since pressure is detected on the basis of the variations in the capacitances $C_1$ and $C_2$ of the two capacitors 22 and 23, a deviation of detection precision even in a situation in which an ambient temperature is variously changed can be reduced in comparison to a case in which a piezoelectric element is used to detect pressure.

Also, as described above, since the width $W_1$ of the reference pressure chamber 6 and the width $W_2$ of the trench 9 may be uniform, the distance $W_1$ between the electrodes of the first capacitor 22 and the distance $W_2$ between the electrodes of the second capacitor 23 may be uniform in an initial stage. Thus, the first capacitor 22 and the second capacitor 23 may be regarded as parallel plate capacitors. As a result, the capacitance $C_1$ of the first capacitor 22 and the capacitance $C_2$ of the second capacitor 23 can be obtained by using formula $C=(\epsilon S)/d$.

Further, in the pressure sensor 1, since the membrane 10 is formed by using the upper semiconductor layer 202 of the SOI substrate 2, an area of the membrane 10 can be simply adjusted by changing a design value of the thickness of the upper semiconductor layer 202. Thus, by forming the upper semiconductor layer 202 as thick as possible within the range of the design dimensions of the pressure sensor 1, an effective area of the membrane 10 can be increased and detection precision can be enhanced. In addition, since the SOI substrate 2 can be prepared, the burden of preparing a semiconductor substrate can be reduced.

Also, since the interior of the reference pressure chamber 6 is maintained in a vacuum state, the pressure within the reference pressure chamber 6 due to a change in a temperature in an ambient environment can be prevented from being changed. As a result, the detection precision of pressure in the pressure sensor 1 can be enhanced.

In FIG. 1, only the single sensor region 5 formed on the SOI substrate 2 is illustrated, but a plurality of sensor regions 5 may be formed on the SOI substrate 2. Various layouts of the plurality of sensor regions 5 may be used without being particularly limited.

Figure 3A:
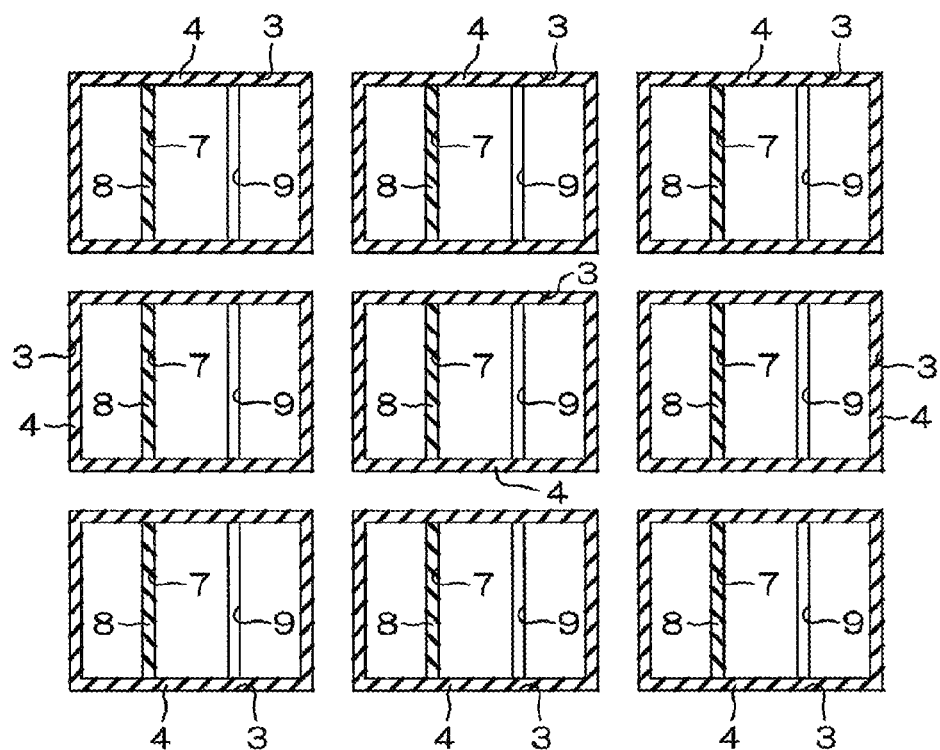
FIGS. 3A and 3B are views illustrating a layout of a plurality of pressure sensors.
Figure 3B:
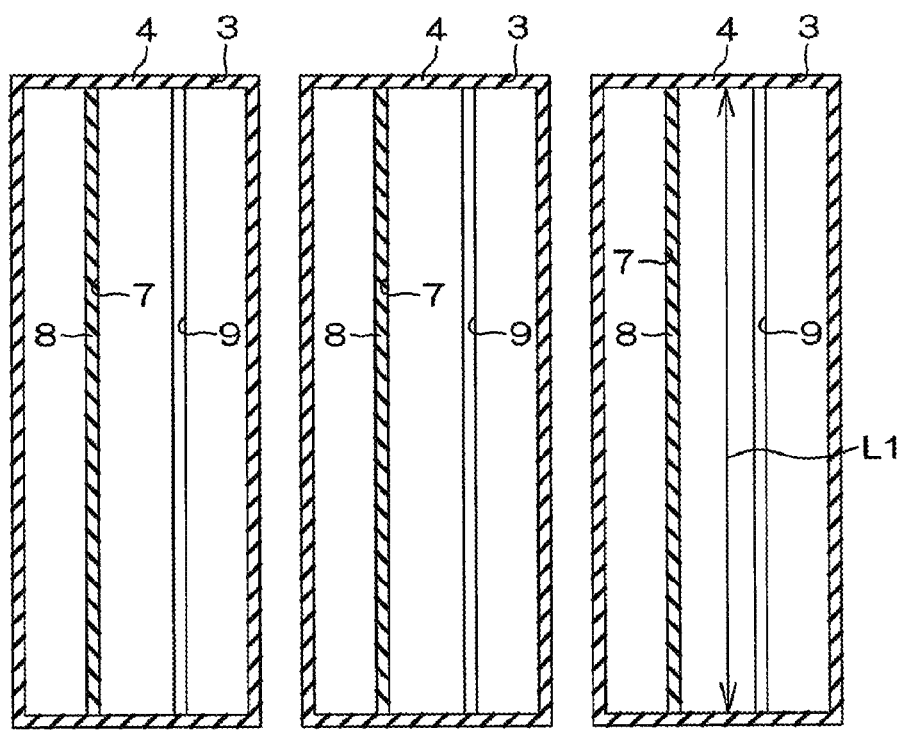

For example, as illustrated in FIG. 3A, the plurality of sensor regions 5 may be arranged in a matrix form. Also, the plurality of sensor regions 5 may be arranged in a stripe form extending in an in-plane direction of the membrane 10. In some embodiments, the respective sensor regions 5 having a stripe shape have a length L1 ranging from 50 μm to 500 μm and a depth (thickness of the upper semiconductor layer 202) ranging from 10 μm to 100 μm, for example.

With such a configuration, since pressure is detected by using the plurality of sensor regions 5, the detection precision of pressure can be further enhanced.

Next, a method for detecting pressure by the pressure sensor 1 will be described in detail.

Figure 4:
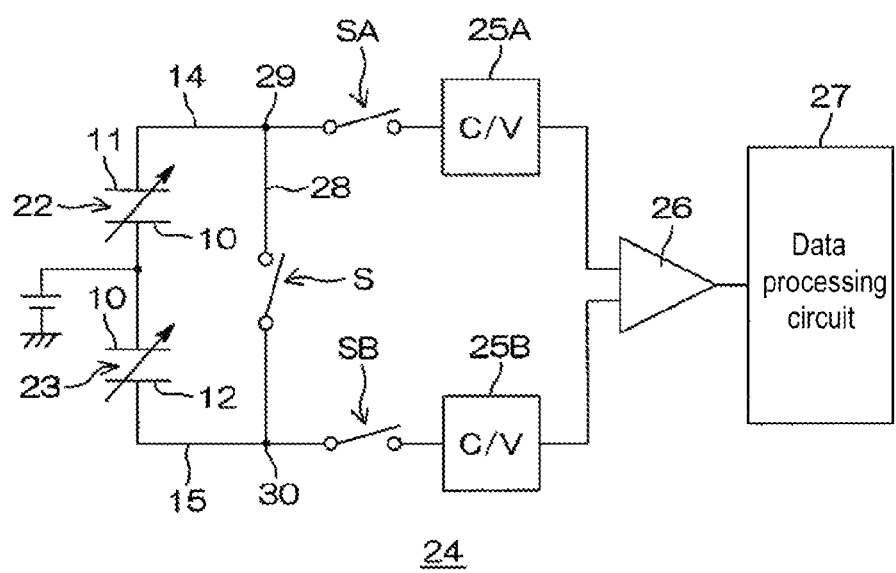
FIG. 4 is a circuit diagram for detecting pressure using the pressure sensor.

FIG. 4 is a circuit diagram for detecting pressure using the pressure sensor 1, according to some embodiments.

A pressure detection circuit 24 according to some embodiments is configured as a differential circuit. The pressure detection circuit 24 includes two C/V conversion circuits 25A and 25B and a single differential amplifier 26.

Input terminals of the two C/V conversion circuits 25A and 25B are connected to the first electrode 11 of the first capacitor 22 and the second electrode 12 of the second capacitor 23 through the first wiring 14 and the second wiring 15, respectively. Output terminals of the two C/V conversion circuits 25A and 25B are connected to an input terminal of the differential amplifier 26. An output terminal of the differential amplifier 26 is connected to a data processing circuit 27.

One end of a connection wiring 28 is connected to a midway portion of the first wiring 14. The other end of the connection wiring 28 is connected to a midway portion of the second wiring 15. In the first wiring 14, a switch SA is interposed between a connection point 29 of the connection wiring 28 and the C/V conversion circuit 25A. In the second wiring 15, a switch SB is interposed between a connection point 30 of the connection wiring 28 and the C/V conversion circuit 25B. Also, a switch S is disposed in a midway portion of the connection wiring 28.

A predetermined voltage (e.g., 3V) is applied to the membrane 10. When detecting pressure, the switches SA and SB are turned on, while the switch S is turned off. In this case, when pressure acts on the membrane 10 to vibrate the membrane 10, the capacitances $C_1$ and $C_2$ of the first capacitor 22 and the second capacitor 23 are changed, respectively. According to a change in the capacitance $C_1$ of the first capacitor 22, a current based on a variation $(\Delta C_1)$ in the capacitance $C_1$ flows to the first wiring 14 connected to the first electrode 11 of the first capacitor 22. The current flowing in the first wiring 14 is input to the C/V conversion circuit 25A. In the C/V conversion circuit 25A, a voltage signal based on the input current is generated. According to a change in the capacitance $C_2$ of the second capacitor 23, a current based on a variation $(\Delta C_2)$ in the capacitance $C_2$ flows to the second wiring 15 connected to the second electrode 12 of the second capacitor 23. The current flowing in the second wiring is input to the C/V conversion circuit 25B. In the C/V conversion circuit 25B, a voltage signal based on the input current is generated. The respective voltage signals generated in the C/V conversion circuits 25A and 25B are input to the differential amplifier 26. In the differential amplifier 26, a differential amplification signal is generated by multiplying an appropriate gain to a difference between the respective voltage signals generated in the C/V conversion circuits 25A and 25B. The differential amplification signal generated in this manner corresponds to a difference between the variations in the capacitances $C_1$ and $C_2$ generated in the first capacitor 22 and the second capacitor 23. Thus, in the data processing circuit 27, a magnitude of pressure acting on the membrane 10 may be obtained on the basis of the differential amplification signal input from the differential amplifier 26.

Figure 5:
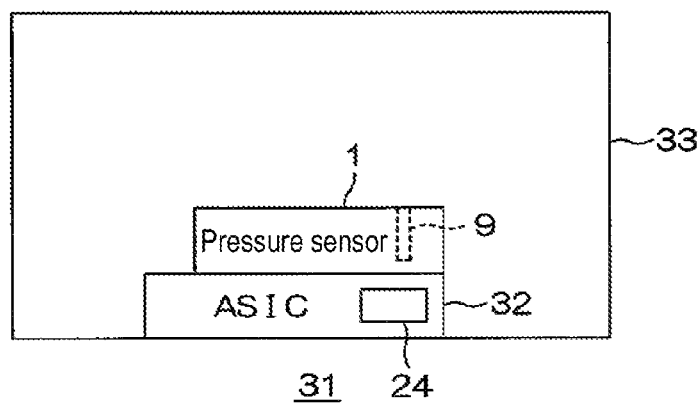
FIG. 5 is a schematic view of a sensor package having the pressure sensor.

FIG. 5 is a schematic view of a sensor package 31 having the pressure sensor 1, according to some embodiments.

The pressure sensor 1 described above may be accommodated in the sensor package 31 illustrated in FIG. 5.

This sensor package 31 includes a circuit chip (or application specific integrated circuit (ASIC)) 32, the pressure sensor 1 disposed on the circuit chip 32 such that an opened surface thereof faces upwardly, and a case 33 for accommodating the circuit chip 32 and the pressure sensor 1. A pressure detection circuit 24 is mounted on the circuit chip 32.

Since the sensor package 31 includes the pressure sensor 1, a deviation of detection precision can be reduced, and further, the pressure sensor package 31 having detection precision capable of coping with a minute change in pressure due to a differential output can be realized.

FIGS. 6A and 6B to FIGS. 17A and 17B are views sequentially illustrating processes of a method of manufacturing the pressure sensor 1, according to some embodiments. In FIGS. 6A and 6B to FIGS. 17A and 17B, A is a plan view and B is a cross-sectional view taken along line Yb-Yb (Y=XI to XVII) in A. In A of each drawing, some of the components of the pressure sensor 1 are omitted for clarification.

Figure 6A:
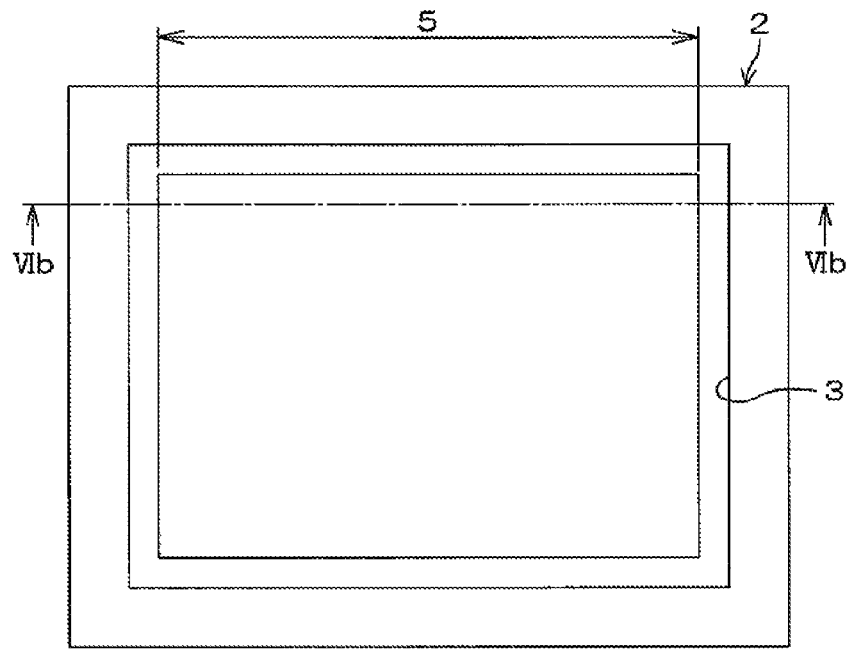
FIGS. 6A and 6B are views illustrating a process of a manufacturing method of the pressure sensor.
Figure 6B:
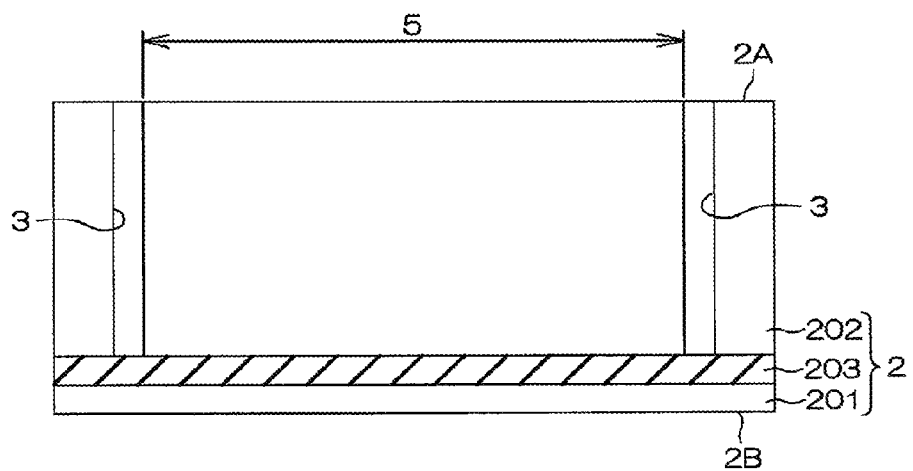

As illustrated in FIGS. 6A and 6B, after the insulating layer 203 is formed on an upper surface of the lower semiconductor layer 201 through thermal oxidization, the upper semiconductor layer 202 is formed on the insulating layer 203 through epitaxial growth. At this point, by regulating the conditions of the epitaxial growth, a thickness of the upper semiconductor layer 202 becoming the membrane 10 can be simply controlled. Accordingly, the SOI substrate 2 is formed. Since the SOI substrate 2 can be easily obtained from the market, the burden of forming the SOI substrate 2 can be reduced.

Next, the upper semiconductor layer 202 of the SOI substrate 2 is selectively dug through anisotropic deep reactive ion etching (RIE), specifically, a Bosch process. Etching is performed until a lower surface of the surrounding trench 3 formed through etching reaches the insulating layer 203. When the lower surface of the trench 3 reaches the insulating layer 203, the insulating layer 203 serves as an etch stop layer, terminating the process. That is, the insulating layer 203 may be used as an etch stop layer since an etching selectivity of the upper semiconductor layer 202 made of silicon and an etching selectivity of the insulating layer 203 made of silicon oxide are different from each other.

Figure 7A:
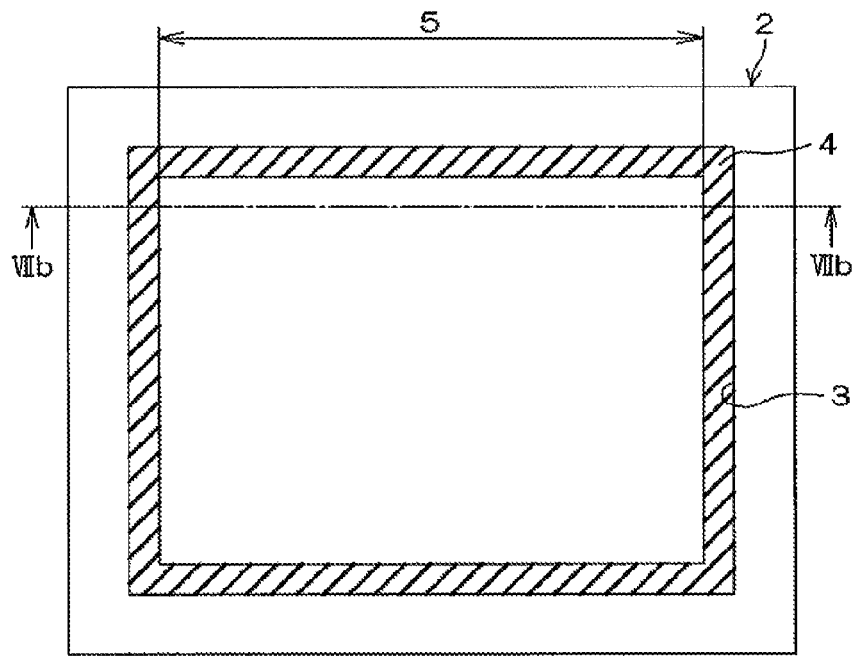
FIGS. 7A and 7B are views illustrating a subsequent process of FIGS. 6A and 6B.
Figure 7B:
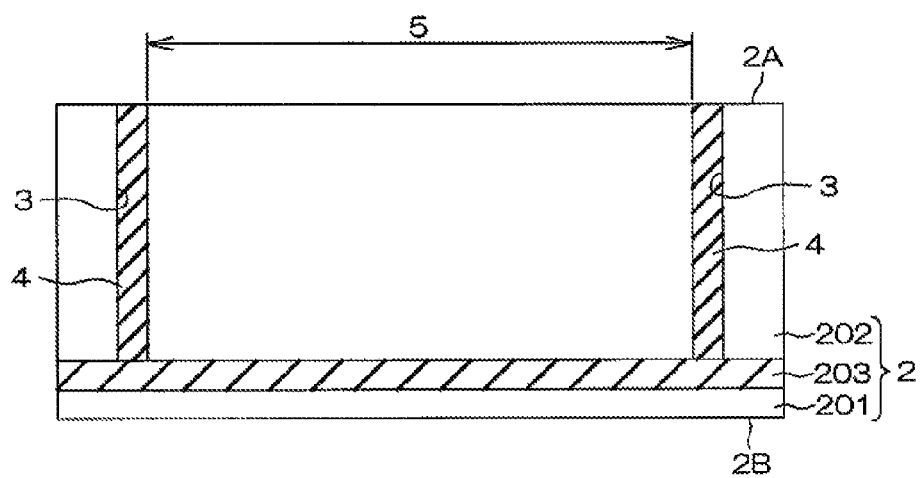

Next, as illustrated in FIGS. 7A and 7B, for example, the SOI substrate 2 is thermally oxidized (for example, at a temperature ranging from 1100 degrees C. to 1150 degrees C. for 24 hours) in a vacuum state to again fill the surrounding trench 3 with the silicon oxide layer. Accordingly, the first insulating layer 4 is formed to demarcate the sensor region 5 in the upper semiconductor layer 202. Since the sensor region 5 is insulated and separated from other portions of the upper semiconductor layer 202 even at a point in time at which the processes illustrated in FIGS. 6A and 6B are terminated, it may be considered that the sensor region 5 has been demarcated as the processes illustrated in FIGS. 6A and 6B are terminated.

Figure 8A:
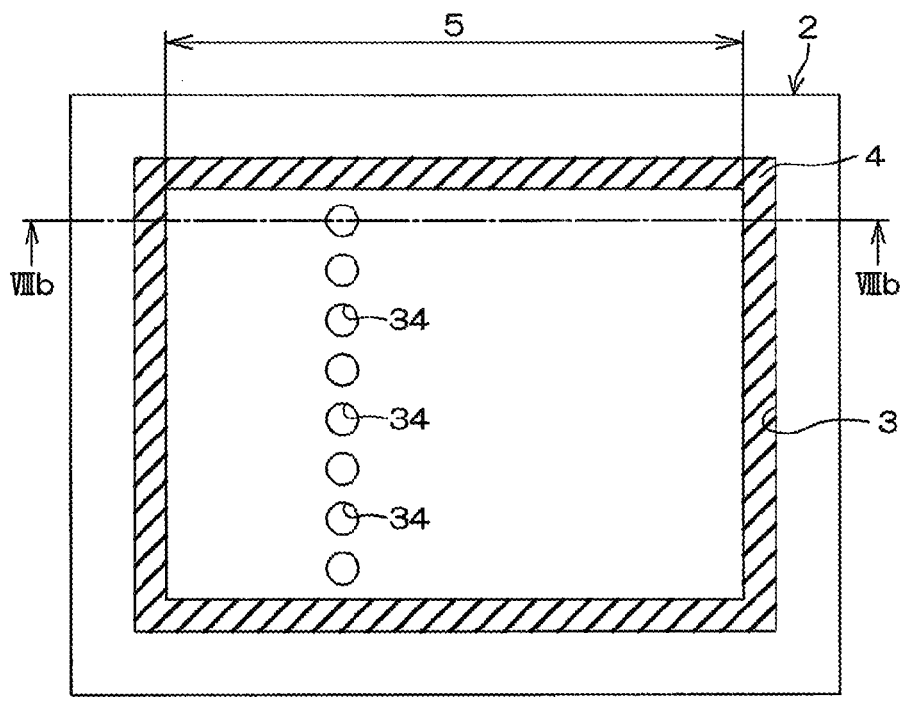
FIGS. 8A and 8B are views illustrating a subsequent process of FIGS. 7A and 7B.
Figure 8B:
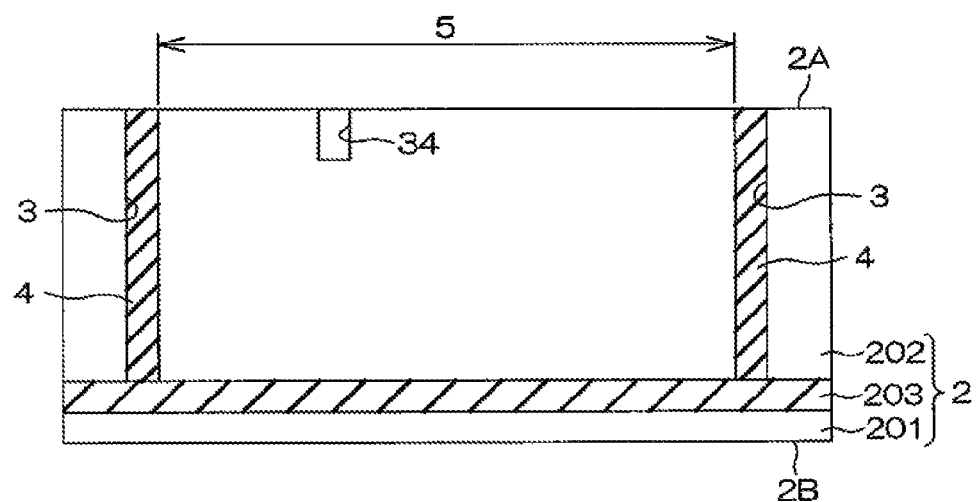

Next, as illustrated in FIGS. 8A and 8B, the upper semiconductor layer 202 of the SOI substrate 2 in the sensor region 5 is dug through anisotropic deep RIE. Here, etching is performed until a lower surface of a concave portion 34 formed through etching remains as deep as a midway portion of the upper semiconductor layer 202 in a thickness direction. Through this etching, a plurality of concave portions 34 is formed in the sensor region 5. As illustrated in FIG. 8A, specifically, the dot shaped concave portions 34 are formed to be arranged in a polka dot pattern (e.g., a linear shape, or the like).

Figure 9A:
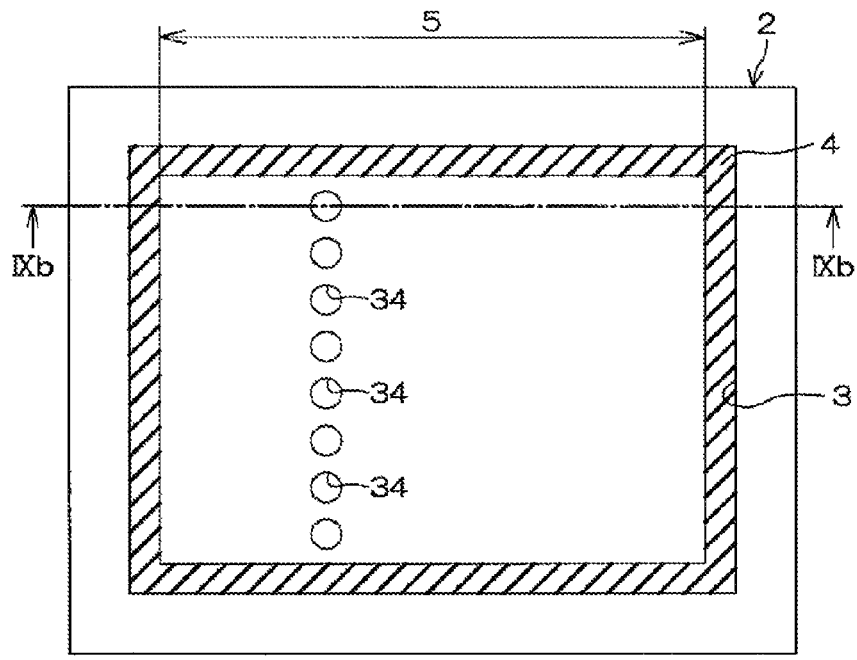
FIGS. 9A and 9B are views illustrating a subsequent process of FIGS. 8A and 8B.
Figure 9B:
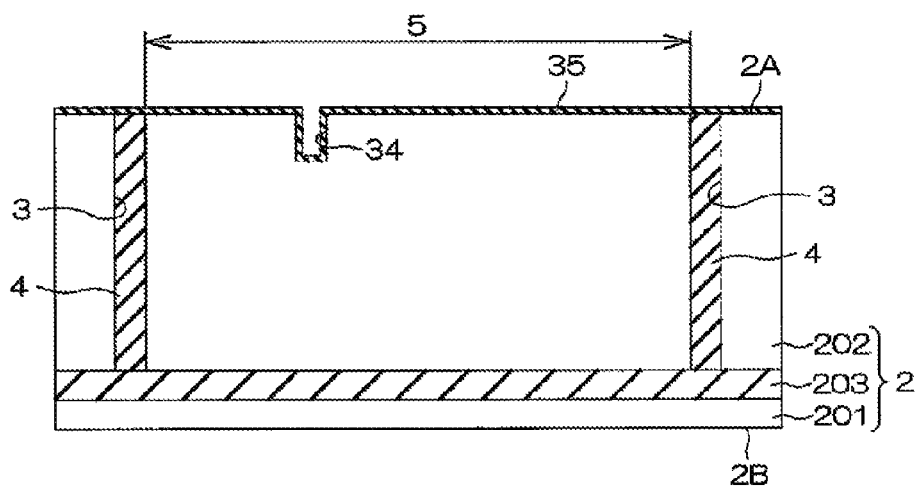

Next, as illustrated in FIGS. 9A and 9B, the protective layer 35 made of an insulating material such as silicon oxide ($SiO_2$) is formed on the entire inner surfaces (i.e., an inner circumferential surface and a lower surface) of the concave portions 34 and on the surface 2A of the SOI substrate 2. When the protective layer 35 is made of silicon oxide, the protective layer 35 may be formed through any methods of thermal oxidization of the SOI substrate 2 and plasma CVD.

Figure 10A:
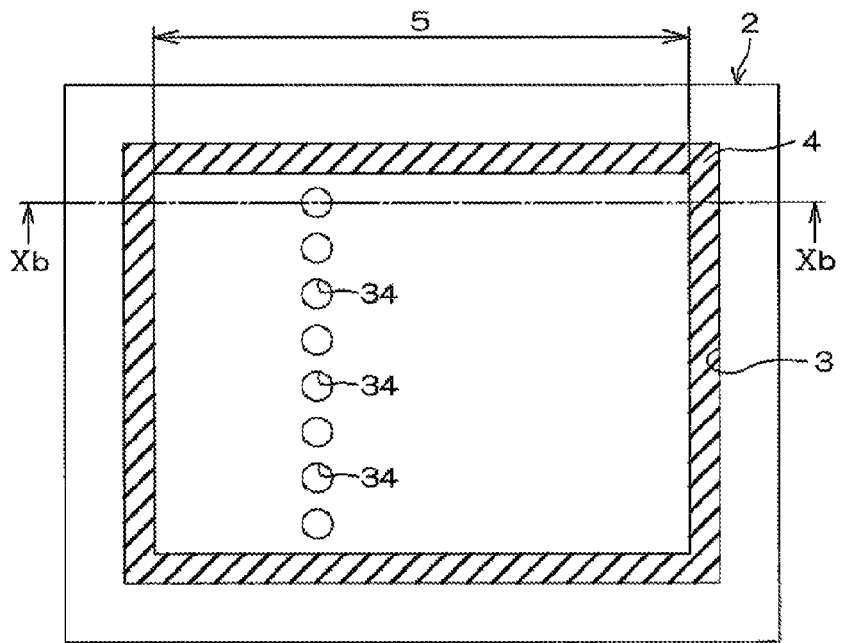
FIGS. 10A and 10B are views illustrating a subsequent process of FIGS. 9A and 9B.
Figure 10B:
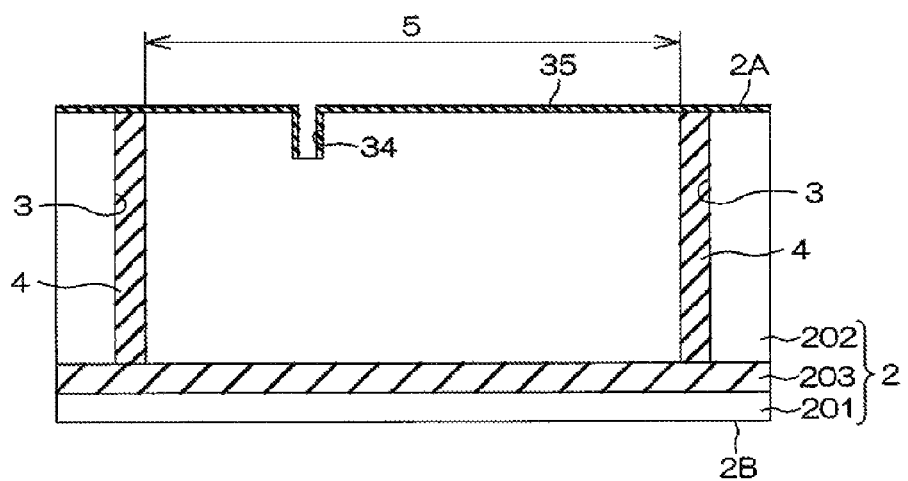

Next, as illustrated in FIGS. 10A and 10B, portions of the lower surfaces of the protective layer 35 in the concave portions 34 are selectively removed through etching back. Accordingly, the upper semiconductor layer 202 is exposed at the lower surfaces of the concave portions 34.

Figure 11A:
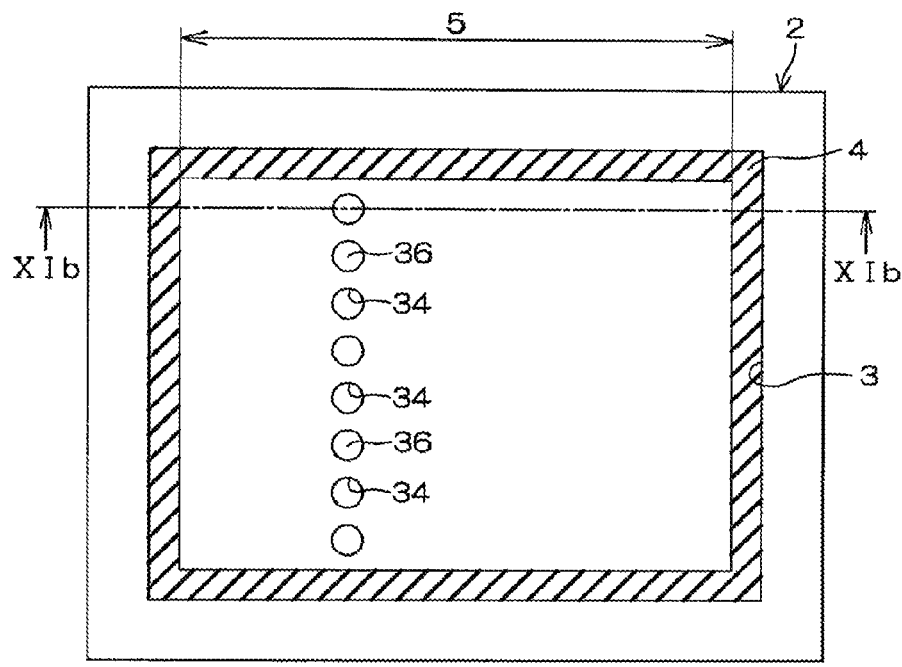
FIGS. 11A and 11B are views illustrating a subsequent process of FIGS. 10A and 10B.
Figure 11B:
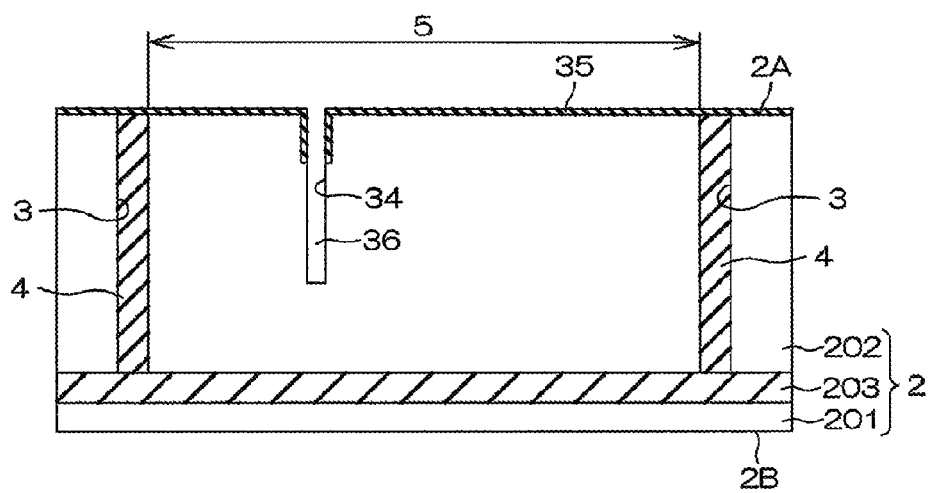

Next, as illustrated in FIGS. 11A and 11B, the lower surfaces of the concave portions 34 are further dug through anisotropic deep RIE using the protective layer 35 as a mask. Accordingly, exposure spaces 36 exposing crystal faces of the upper semiconductor layer 202 are formed at the lower surfaces and lateral surfaces of the concave portions 34.

Figure 12A:
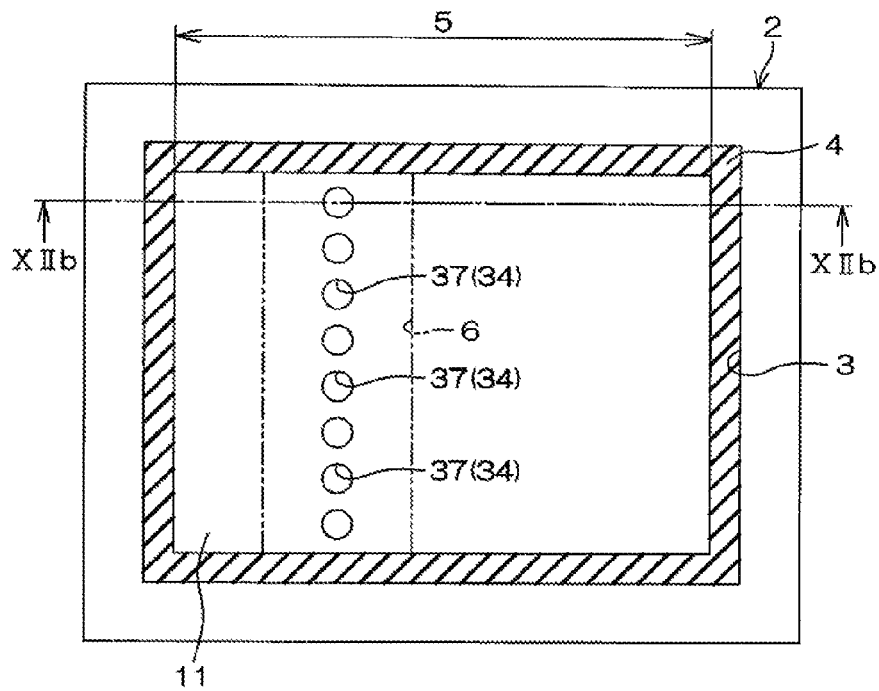
FIGS. 12A and 12B are views illustrating a subsequent process of FIGS. 11A and 11B.
Figure 12B:
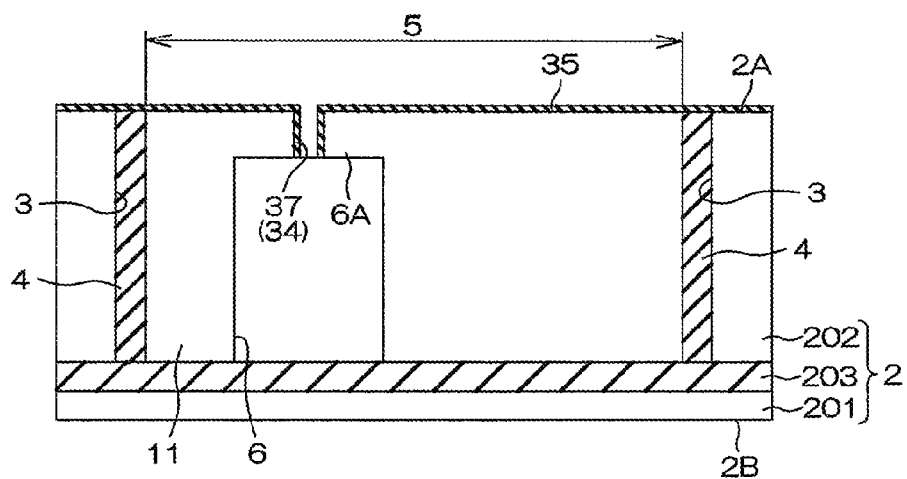

Next, as illustrated in FIGS. 12A and 12B, reactive ions and etching gas are supplied to the exposure spaces 36 of the concave portions 34 through isotropic RIE. Then, by reactions of the reactive ions, or the like, the upper semiconductor layer 202 is etched, starting from the exposure spaces 36, in the thickness direction of the SOI substrate 2 and in a direction parallel to the surface 2A of the SOI substrate 2. Accordingly, all the mutually adjacent exposure spaces 36 are integrated to form the reference pressure chamber 6 within the SOI substrate 2, and the first electrode 11 is simultaneously formed. Also, due to the formation of the reference pressure chamber 6, the concave portions 34 become through holes 37 penetrating between the surface 2A of the SOI substrate 2 and the reference pressure chamber 6.

Next, an etching gas may be supplied to the through holes 37 to remove the protective layer 35 remaining on the inner surfaces of the through holes 37. In this embodiment, hydrofluoric acid (HF) is used as an etching gas, and the etching gas is slantingly supplied with respect to the through holes 37. Accordingly, the crystal faces of the upper semiconductor layer 202 may be exposed from the inner surfaces of the through holes 37 by removing the protective layer 35. For example, when the protective layer 35 is formed through plasma CVD, the quality of the protective layer 35 is degraded relative to a thermal oxide layer. Thus, once the inner surfaces of the through holes 37 are cleared by removing the protective layer 35, the second insulating layer 8 formed of a thermal oxide layer may be formed within the through holes 37 in a subsequent process. Accordingly, the layer quality of the second insulating layer 8 can be enhanced.

Figure 13A:
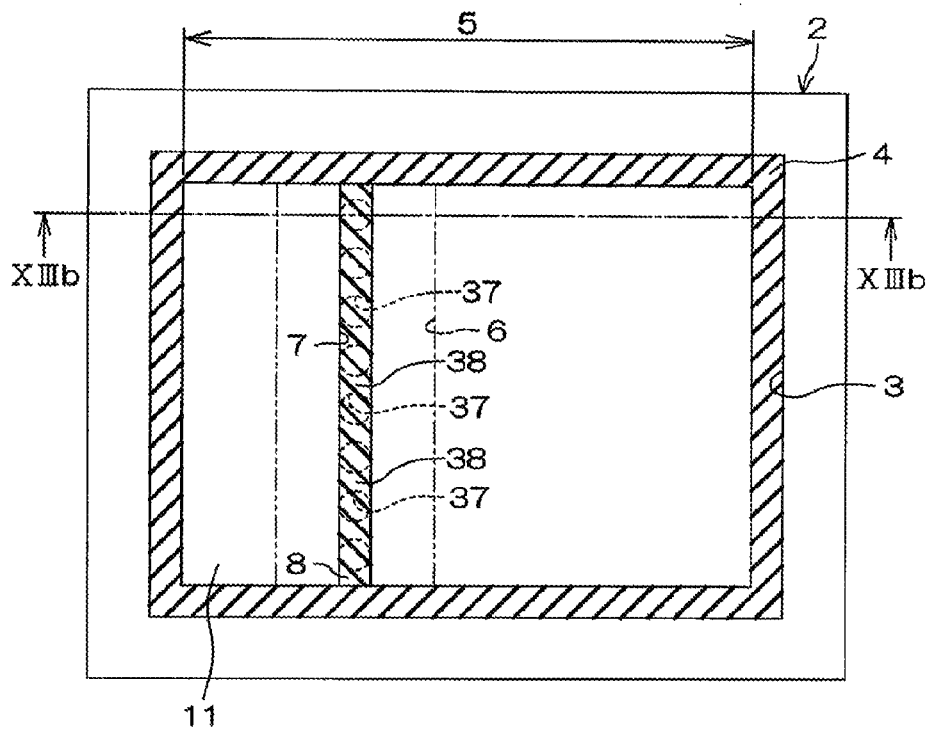
FIGS. 13A and 13B are views illustrating a subsequent process of FIGS. 12A and 12B.
Figure 13B:
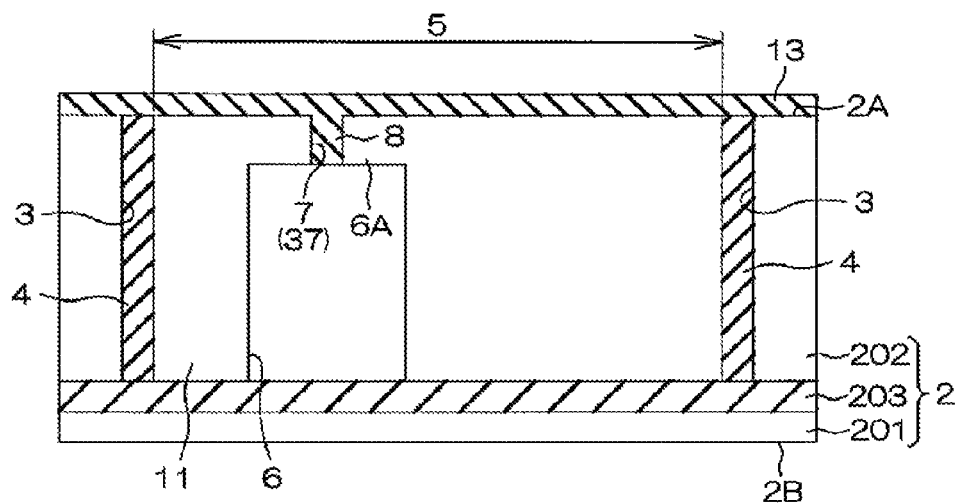

Next, as illustrated in FIGS. 13A and 13B, for example, the SOI substrate 2 is thermally oxidized (e.g., at a temperature ranging from 1100 degrees C. to 1150 degrees C. for 24 hours) in a vacuum state to form the second insulating layer 8. Specifically, when the SOI substrate 2 is thermally oxidized, a portion of the upper semiconductor layer 202 is changed into a silicon oxide layer having a concentric shape from the outer circumference of each through hole 37 and at the same time the corresponding silicon oxide layer is thermally expanded to fill each through hole 37 as illustrated in FIG. 13A. In FIG. 13A, circles in the dashed line are the outline of the through hole 37 present before the formation of the second insulating layer 8. Further, during the thermal oxidization, the semiconductor portion 38 sandwiched by neighboring through holes 37 is also changed into a silicon oxide layer, connecting the silicon oxide layers within the neighboring through holes 37. As a result, the circumferential surfaces of the plurality of through holes 37 are connected to form the through hole 7 and the second insulating layer 8 having a slit shape with a wavy outline. Also, during the thermal oxidation, the protective layer 35 on the surface 2A of the SOI substrate 2 becomes thicker to form the interlayer 13.

Figure 14A:
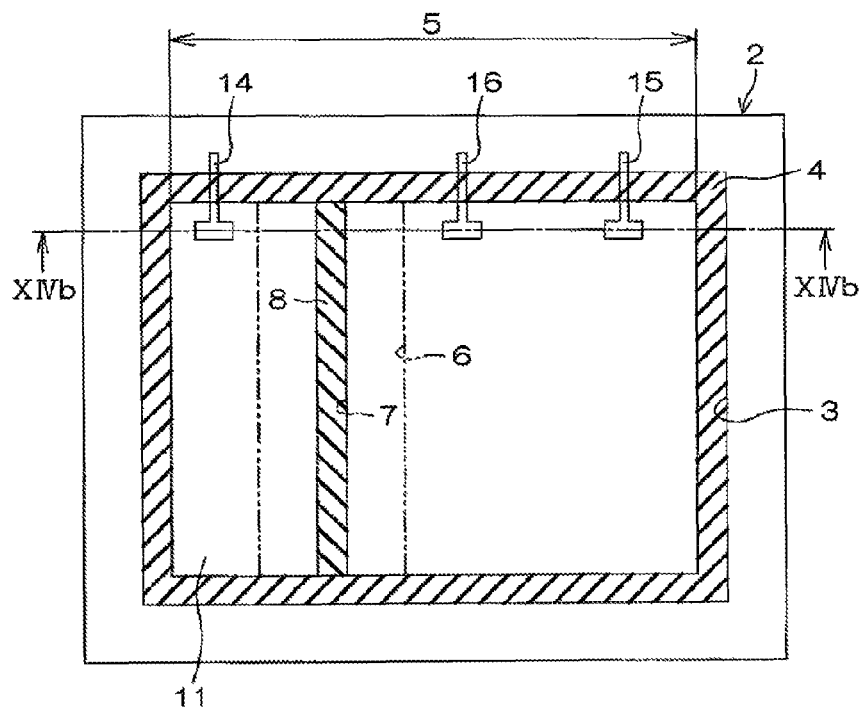
FIGS. 14A and 14B are views illustrating a subsequent process of FIGS. 13A and 13B.
Figure 14B:
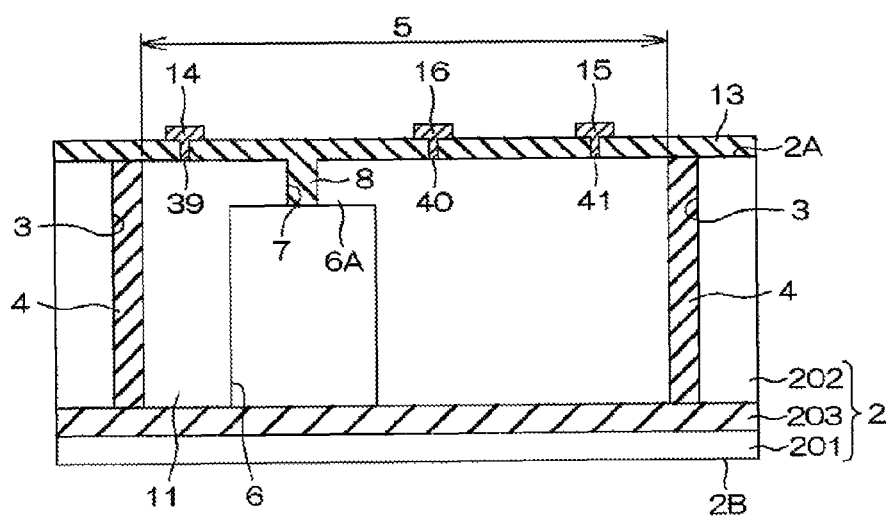

Next, as illustrated in FIGS. 14A and 14B, for example, the interlayer 13 is selectively removed through plasma etching, and a contact hole 39 for exposing the first electrode 11 and contact holes 40 and 41 for exposing portions in which the membrane 10 and the second electrode 12 are formed are simultaneously formed. Thereafter, the first wiring 14, the second wiring 15, and the third wiring 16 are formed on the interlayer 13.

Figure 15A:
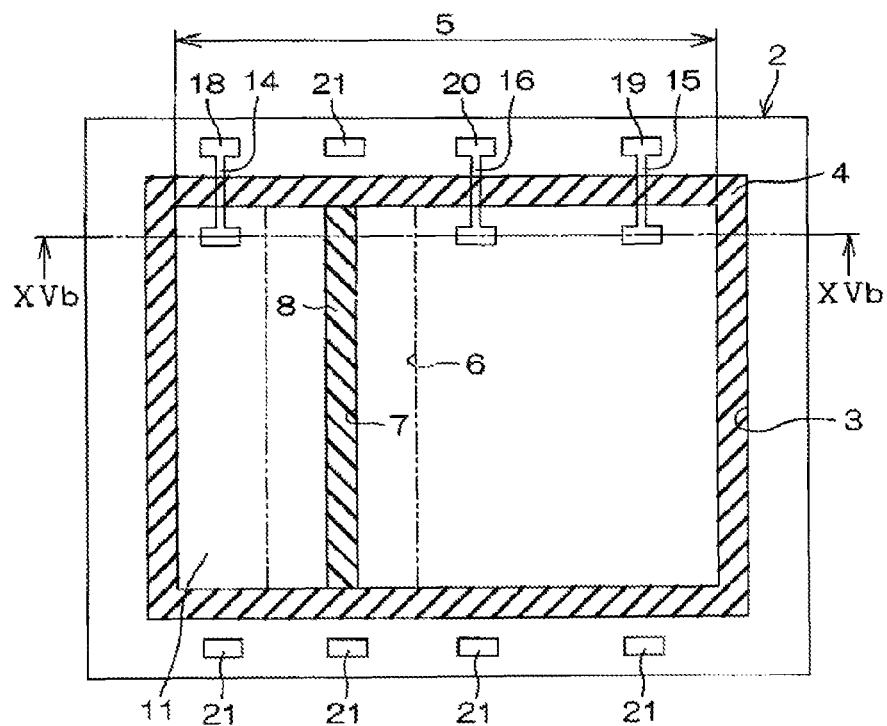
FIGS. 15A and 15B are views illustrating a subsequent process of FIGS. 14A and 14B.
Figure 15B:
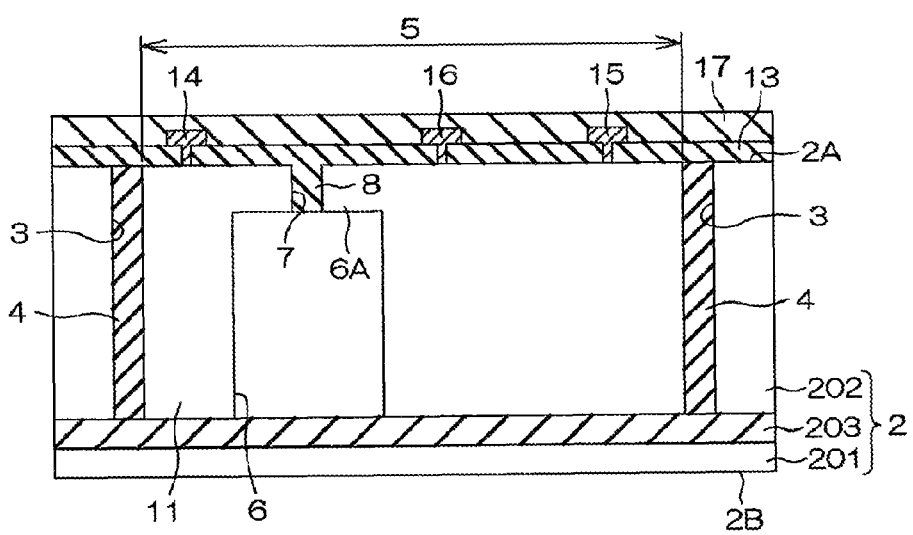

Next, as illustrated in FIGS. 15A and 15B, for example, the surface protective layer 17 is formed on the interlayer 13 through plasma CVD. Thereafter, openings are selectively formed in the surface protective layer 17, forming the first pad 18, the second pad 19, the third pad 20, and the pad 21.

Figure 16A:
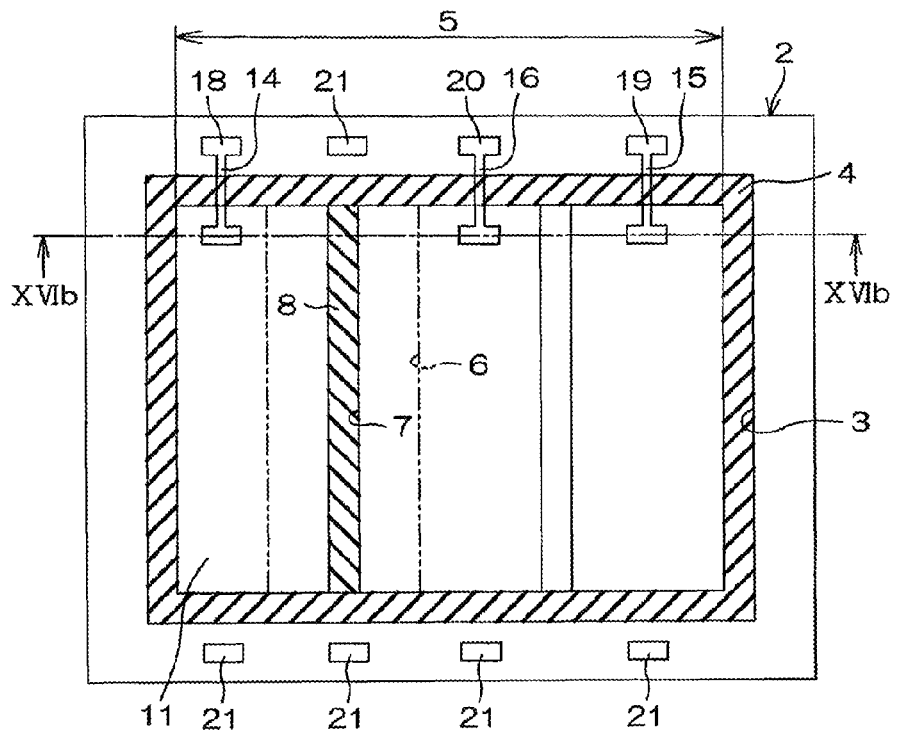
FIGS. 16A and 16B are views illustrating a subsequent process of FIGS. 15A and 15B.
Figure 16B:
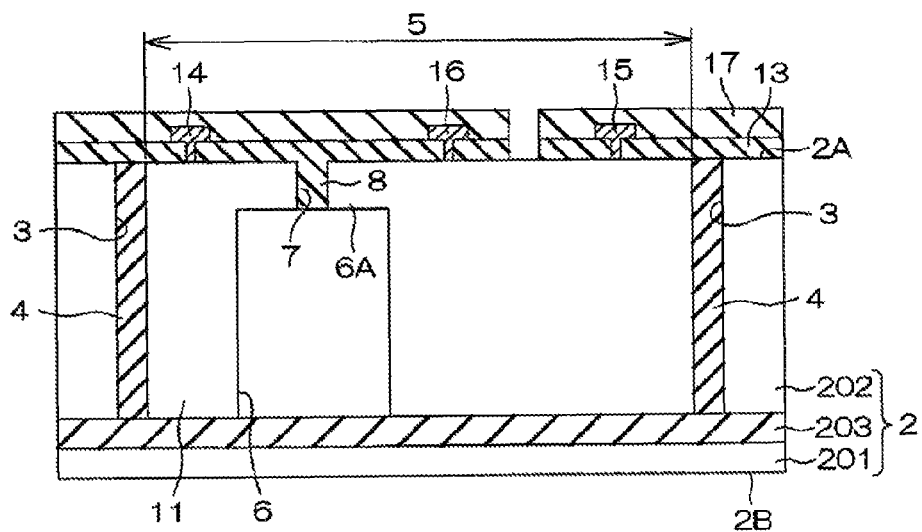

Next, as illustrated in FIGS. 16A and 16B, a region corresponding to the trench 9 is selectively removed in the interlayer 13 and the surface protective layer 17.

Figure 17A:
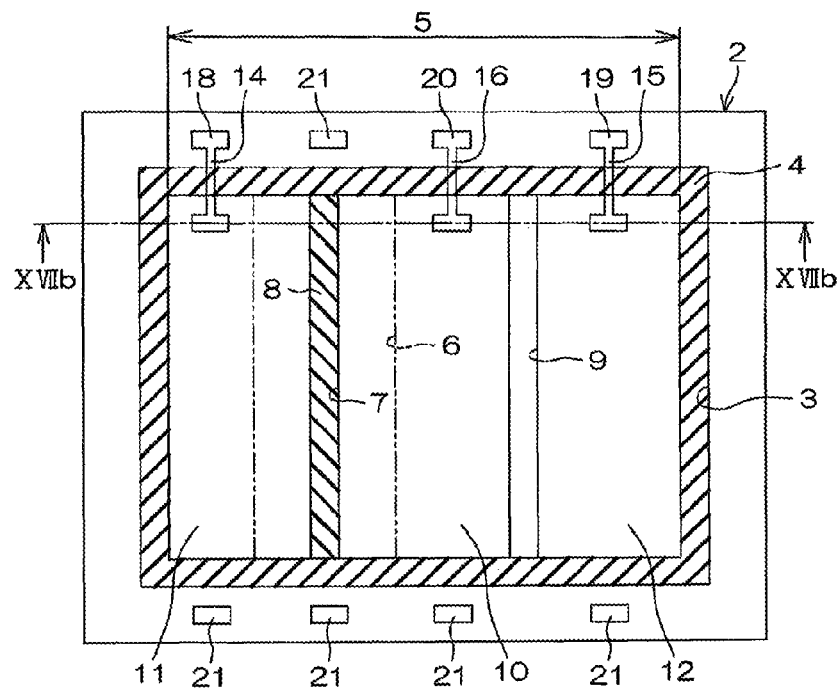
FIGS. 17A and 17B are views illustrating a subsequent process of FIGS. 16A and 16B.
Figure 17B:
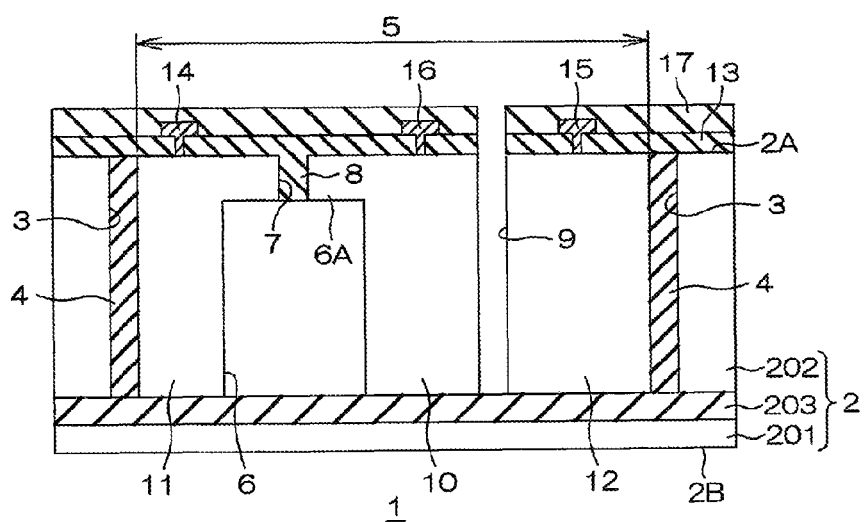

Next, as illustrated in FIGS. 17A and 17B, the upper semiconductor layer 202 of the SOI substrate 2 is selectively dug through anisotropic deep RIE using the interlayer 13 and the surface protective layer 17 as masks. Here, etching is performed until a lower surface of the trench 9 formed through etching reaches the insulating layer 203, and when the lower surface of the trench 9 reaches the insulating layer 203, the insulating layer 203 serves as an etch stop layer, terminating the process. Thus, the trench 9 is formed and the membrane 10 and the second electrode 12 are simultaneously formed. Through the foregoing processes, the pressure sensor 1 having the structure illustrated in FIGS. 1A and 1B is obtained.

According to the foregoing method, in forming the membrane 10, the first electrode 11, and the second electrode 12, various processes such as deep RIE, and thermal oxidization may be performed only on the SOI substrate 2. Thus, a deviation of detection precision can be reduced, and further, the pressure sensor 1 having detection precision capable of coping with even a minute change in pressure due to a differential output can be simply manufactured. In addition, since the used SOI substrate 2 is made of a low-priced material, the cost incurred for the substrate can be further reduced.

Further, since a direction perpendicular to the membrane 10 (a thickness direction of the membrane 10) is parallel to the direction of the surface 2A of the SOI substrate 2, a thickness of the membrane 10 can be simply set by adjusting a position of the trench 9 in etching process.

Moreover, since the trench 9 opened to the surface 2A side is finally formed, the application of resist, or the like on the surface 2A can be eliminated. Thus, a space within the trench 9 can be secured.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A capacitive pressure sensor, comprising:
a semiconductor substrate configured to have an insulating layer and an upper semiconductor layer formed on the semiconductor substrate;
a first insulating portion formed in the upper semiconductor layer to surround a sensor region disposed in an internal area of the upper semiconductor layer, the sensor region being defined by the first insulating portion together with the insulating layer;
a reference pressure chamber formed in a lower portion of the sensor region to divide the lower portion of the sensor region in a direction traversing the first insulating portion, a lower surface of the reference pressure chamber being defined by the insulating layer;
a second insulating portion formed in a surface portion of the sensor region above the reference pressure chamber to divide the surface portion of the sensor region in the direction; and
a trench formed from a surface of the upper semiconductor layer until the insulating layer to divide the sensor region in the direction,
wherein the sensor region is divided into at least three semiconductor parts disposed in sequence in the direction by the reference pressure chamber, the second insulating portion, and the trench, the three semiconductor parts being insulated from one another, and
wherein the three semiconductor parts comprise:
a membrane disposed between the reference pressure chamber and the trench;
a first electrode facing the membrane with the reference pressure chamber being interposed therebetween; and
a second electrode facing the membrane with the trench being interposed therebetween.

2. The capacitive pressure sensor of claim 1, wherein the semiconductor substrate has a structure in which the insulating layer is sandwiched between a lower semiconductor layer and the upper semiconductor layer.

3. The capacitive pressure sensor of claim 2, wherein the lower semiconductor layer and the upper semiconductor layer are formed of silicon and the insulating layer is formed of silicon oxide.

4. The capacitive pressure sensor of claim 2, wherein the upper semiconductor layer has a thickness ranging from 15 µm to 30 µm.

5. The capacitive pressure sensor of claim 1, wherein the reference pressure chamber has a predetermined width in the direction.

6. The capacitive pressure sensor of claim 1, wherein the trench has a predetermined width in the direction.

7. The capacitive pressure sensor of claim 1, wherein the membrane has a thickness ranging from 0.5 µm to 5 µm.

8. The capacitive pressure sensor of claim 1, wherein a plurality of the sensor regions are arranged in the semiconductor substrate in a matrix form.

9. The capacitive pressure sensor of claim 1, wherein a plurality of the sensor regions are arranged in the semiconductor substrate in a stripe form.

10. The capacitive pressure sensor of claim 1, wherein the first insulating portion comprises a first insulating layer made of an insulating material selectively buried in the semiconductor substrate.

11. The capacitive pressure sensor of claim 1, wherein the second insulating portion comprises a second insulating layer made of an insulating material selectively buried in the semiconductor substrate.

12. The capacitive pressure sensor of claim 1, wherein the capacitive pressure sensor comprises a plurality of wirings disposed between an inner side and an outer side of the sensor region, and
wherein the plurality of wirings comprise:
a first wiring connected to the first electrode;
a second wiring connected to the second electrode; and
a third wiring connected to the membrane.

13. The capacitive pressure sensor of claim 1, wherein an interior of the reference pressure chamber is hermetically closed.

14. A pressure sensor package, comprising:
a capacitive pressure sensor of claim 1;
a circuit chip configured to have a differential circuit for detecting pressure acting on a membrane on the basis of a difference between a variation in capacitance of a first capacitor configured by a first electrode and the membrane and a variation in capacitance of a second capacitor configured by the membrane and a second electrode; and
a case configured to accommodate the circuit chip and the capacitive pressure sensor,
wherein the capacitive pressure sensor is disposed on the circuit chip such that an opened surface of a trench of the capacitive pressure sensor faces upwardly.

15. A method of manufacturing a capacitive pressure sensor, comprising:
preparing a semiconductor substrate having an insulating layer and an upper semiconductor layer formed thereon;
forming a surrounding trench from the surface of the semiconductor substrate to the insulating layer to surround a sensor region disposed in an internal area of the upper semiconductor layer;
forming a first insulating layer to fill the surrounding trench, thereby defining the sensor region in a surface portion of the semiconductor substrate by the insulating layer and the first insulating layer;
selectively forming a plurality of concave portions in the sensor region;
forming a protective layer in each inner surface of the plurality of concave portions;
selectively removing portions on lower surfaces of the concave portions in the protective layer;
forming a reference pressure chamber for dividing a lower portion of the sensor region in a direction traversing the first insulating layer by digging the concave portions toward the insulating layer through anisotropic etching, and then connecting lower portions of the plurality of concave portions through isotropic etching;
forming a second insulating layer for dividing a surface portion of the sensor region above the reference pressure chamber in the direction by changing a portion sandwiched by neighboring through holes into a silicon oxide layer such that a through hole formed of the concave portion penetrating between the surface of the semiconductor substrate and the reference pressure chamber through thermal oxidation treatment is filled with a silicon oxide layer, and at the same time the silicon oxide layers of the neighboring through holes are connected; and
forming a trench from the surface of the semiconductor substrate to the insulating layer by etching the sensor region for dividing the sensor region in the direction.

16. The method of claim 15, wherein the semiconductor substrate has a structure in which the insulating layer is sandwiched between a lower semiconductor layer and the upper semiconductor layer, and
wherein the method further comprises forming the upper semiconductor layer on the insulating layer through epitaxial growth, after forming the insulating layer on the lower semiconductor layer.

17. The method of claim 15, wherein the method further comprises removing the protective layer remaining on an inner surface of the through hole by supplying an etching gas to the through hole, before forming the second insulating layer.

18. The method of claim 15, wherein the forming a second insulating layer comprises performing thermal oxidation treatment in a vacuum state.

\* \* \* \* \*